United States Patent
He et al.

(10) Patent No.: US 11,660,969 B2
(45) Date of Patent: May 30, 2023

(54) ELECTRIC VEHICLE SOUND ENHANCEMENT

(71) Applicant: GM GLOBAL TECHNOLOGY OPERATIONS LLC, Detroit, MI (US)

(72) Inventors: Song He, Troy, MI (US); Brent S. Gagas, Ferndale, MI (US); Brian A. Welchko, Oakland, MI (US); Kerrie M. Spaven, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 329 days.

(21) Appl. No.: 17/061,921

(22) Filed: Oct. 2, 2020

(65) Prior Publication Data

US 2022/0105813 A1   Apr. 7, 2022

(51) Int. Cl.
| | |
|---|---|
| *B60L 50/51* | (2019.01) |
| *B60W 10/08* | (2006.01) |
| *H02P 9/44* | (2006.01) |
| *H02P 25/024* | (2016.01) |
| *H02P 27/04* | (2016.01) |

(52) U.S. Cl.
CPC .............. *B60L 50/51* (2019.02); *B60W 10/08* (2013.01); *B60L 2210/40* (2013.01); *B60W 2520/10* (2013.01); *B60W 2720/10* (2013.01); *H02P 9/44* (2013.01); *H02P 25/024* (2016.02); *H02P 27/04* (2013.01)

(58) Field of Classification Search
CPC ..... B60L 50/51; B60L 2210/40; B60W 10/08; H02P 25/024; H02P 9/44; H02P 27/04
USPC ........................................................ 318/801
See application file for complete search history.

(56) References Cited

U.S. PATENT DOCUMENTS

| | | | |
|---|---|---|---|
| 2016/0181961 A1* | 6/2016 | Holmburg | ............... H02P 21/14 318/400.02 |
| 2020/0343848 A1* | 10/2020 | Lee | ........................ H02P 27/085 |
| 2021/0257952 A1* | 8/2021 | Weckert | .................. H02P 23/14 |

\* cited by examiner

*Primary Examiner* — Kawing Chan
(74) *Attorney, Agent, or Firm* — Cantor Colburn LLP

(57) ABSTRACT

Control of an AC motor includes rotation over an operating speed range with the output from an inverter by operating the inverter at switching frequencies that vary in proportion to rotor speed. The operating speed range is parsed into a plurality of speed regions and the switching frequencies within each operating speed region may correspond to a respective pulse ratio that is different from the respective pulse ratio corresponding to an adjacent speed region.

17 Claims, 5 Drawing Sheets

ELECTRIC VEHICLE SOUND ENHANCEMENT

INTRODUCTION

This disclosure is related to electric motor control.

Electric vehicles, including hybrid electric vehicles, include at least one rotary traction motor for producing propulsion power. Brushless AC motors are a popular choice for propulsion motors. AC motors include a stator including one or more phases of AC power. Typically, AC propulsion motors are polyphase and employ three or more phases of AC power to generate a rotating magnetic field in the stator to drive the motor's rotor.

Electric and hybrid vehicles may include a high voltage (HV) energy storage device (ESD) for providing power to drive the propulsion motor(s) and to low voltage (LV) applications. ESDs are typically electrochemical devices. Inverters are employed to convert the DC power of the ESD to AC power to drive the propulsion motor(s) by way of a rotating magnetic field. Inverters may be bidirectional and operated to convert AC power from the propulsion motor operating in a regenerating mode to DC power which is returned to the ESD. Similarly, the inverter may be employed in ESD bulk recharging. Inverters may have multiple solid-state switching devices which operate at high switching frequencies to synthesize quality AC voltages and currents for use by the propulsion motor.

Inverter switching frequencies are known to induce audible noise within the polyphase bus structure, the propulsion motor, propulsion drive unit and any other mechanically coupled structures including final drives, axles and vehicle structure. Such inverter induced noise is primarily at the switching frequency of the inverter and certain proximate sidebands and may be highly tonal and sharp in pitch, therefore generally objectionable. Noise, vibration, harshness experts go to great lengths to attenuate this noise as many end users may find it objectionable and nonintuitive in an automotive environment. However, while some success at noise isolation and decoupling is possible, a certain level of noise is inevitably coupled into the passenger compartment of the vehicle and will reach the occupants' ears.

SUMMARY

In one exemplary embodiment, an apparatus may include an AC electric motor having a speed operating range, a DC power source, an inverter operatively coupled between the DC power source and the AC motor for converting DC power to AC power to drive the AC motor, and a processor operatively coupled to the inverter and configured to parse the AC motor speed operating range into a plurality of speed regions, and within each speed region to operate the inverter to a respective predetermined switching frequency profile to maintain and inverter pulse ratio to a respective predetermined pulse ratio profile.

In addition to one or more of the features described herein, the pulse ratio profiles may include linear profiles.

In addition to one or more of the features described herein, the pulse ratio profiles may include fixed value profiles.

In addition to one or more of the features described herein, the switching frequency profiles may produce continuous switching orders in adjacent speed regions.

In addition to one or more of the features described herein, the switching frequency profiles may produce discontinuous switching orders in adjacent speed regions.

In addition to one or more of the features described herein, the predetermined switching frequency profiles may include frequency dither.

In addition to one or more of the features described herein, the apparatus may further include the processor configured to operate the inverter between multiple predetermined switching frequency profiles within each speed region.

In addition to one or more of the features described herein, the switching frequency profiles may be limited to frequencies between predetermined upper and lower limits.

In addition to one or more of the features described herein, the apparatus may further include the processor configured to operate the inverter at a fixed switching frequency when the AC motor speed is below a predetermined lower limit.

In addition to one or more of the features described herein, the apparatus may further include the processor configured to limit operation of the inverter to switching frequencies above a predetermined lower limit.

In another exemplary embodiment, a method may include rotating a rotor of an AC motor over an operating speed range with the output from an inverter by operating the inverter at switching frequencies that vary in proportion to rotor speed. The operating speed range may be parsed into a plurality of speed regions and the switching frequencies within each operating speed region may correspond to a respective pulse ratio that is different from the respective pulse ratio corresponding to an adjacent speed region.

In addition to one or more of the features described herein the switching frequencies may produce continuous switching orders in adjacent operating speed regions.

In addition to one or more of the features described herein the switching frequencies may produce discontinuous switching orders in adjacent operating speed regions.

In addition to one or more of the features described herein the switching frequencies may include frequency dither.

In yet another exemplary embodiment, a method may include parsing an AC motor speed operating range into a plurality of speed regions, and within each speed region, operating an inverter operatively coupled to the AC motor to a respective predetermined switching frequency profile to maintain an inverter pulse ratio to a respective predetermined pulse ratio profile.

In addition to one or more of the features described herein the pulse ratio profiles may include fixed value profiles.

In addition to one or more of the features described herein the switching frequency profiles may produce continuous switching orders in adjacent speed regions.

In addition to one or more of the features described herein the switching frequency profiles may produce discontinuous switching orders in adjacent speed regions.

In addition to one or more of the features described herein the predetermined switching frequency profiles may include frequency dither.

The above features and advantages, and other features and advantages of the disclosure are readily apparent from the following detailed description when taken in connection with the accompanying drawings.

BRIEF DESCRIPTION OF THE DRAWINGS

Other features, advantages, and details appear, by way of example only, in the following detailed description, the detailed description referring to the drawings in which.

DETAILED DESCRIPTION

Figure 1:
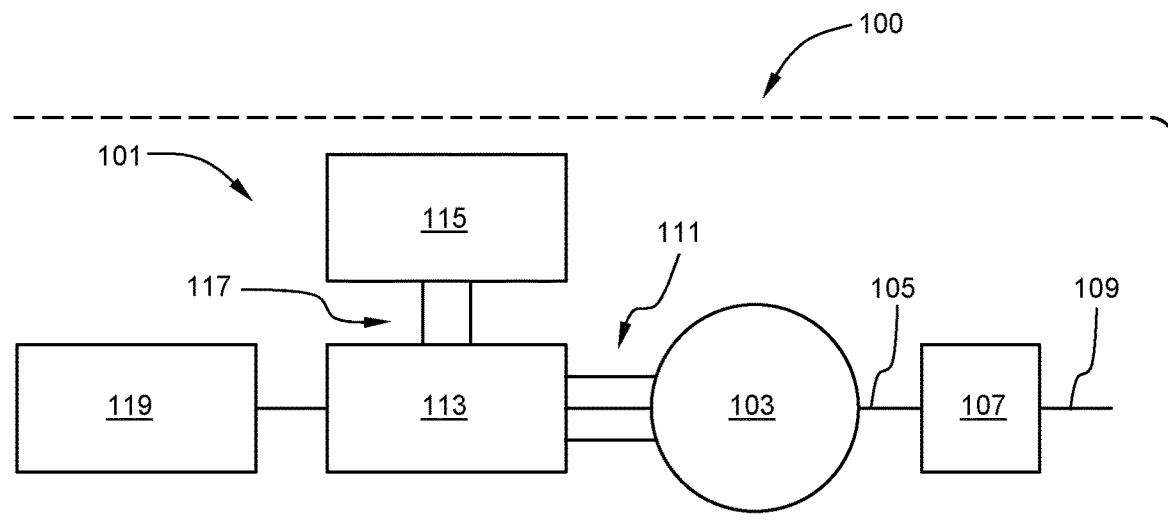
FIG. 1 illustrates an exemplary propulsion system of a vehicle, in accordance with the present disclosure.

The following description is merely exemplary in nature and is not intended to limit the present disclosure, its application or uses. Throughout the drawings, corresponding reference numerals indicate like or corresponding parts and features.

As used herein, control module, module, control, controller, control unit, electronic control unit, processor and similar terms mean any one or various combinations of one or more of Application Specific Integrated Circuit(s) (ASIC), electronic circuit(s), central processing unit(s) (preferably microprocessor(s)) and associated memory and storage (read only memory (ROM), random access memory (RAM), electrically programmable read only memory (EPROM), hard drive, etc.) or microcontrollers executing one or more software or firmware programs or routines, combinational logic circuit(s), input/output circuitry and devices (I/O) and appropriate signal conditioning and buffer circuitry, high speed clock, analog to digital (A/D) and digital to analog (D/A) circuitry and other components to provide the described functionality. A control module may include a variety of communication interfaces including point-to-point or discrete lines and wired or wireless interfaces to networks including wide and local area networks, on vehicle controller area networks and in-plant and service-related networks. Functions of a control module as set forth in this disclosure may be performed in a distributed control architecture among several networked control modules. Software, firmware, programs, instructions, routines, code, algorithms and similar terms mean any controller executable instruction sets including calibrations, data structures, and look-up tables. A control module has a set of control routines executed to provide described functions. Routines are executed, such as by a central processing unit, and are operable to monitor inputs from sensing devices and other networked control modules and execute control and diagnostic routines to control operation of actuators. Routines may be executed at regular intervals during ongoing engine and vehicle operation. Alternatively, routines may be executed in response to occurrence of an event, software calls, or on demand via user interface inputs or requests.

FIG. 1 illustrates an exemplary propulsion system 101 of a vehicle 100. Propulsion system 101 may include an electric drive unit (EDU) of varying complexity, componentry and integration. An exemplary highly integrated EDU may include, for example, an electric motor, reduction and differential gearing, housings including air and liquid cooling features, electrical bus structures, HV bus structures, power electronics (e.g., inverters), controllers, and other related components. Propulsion system 101 may include AC electric machine (hereafter AC motor) 103 having a motor output shaft 105. The motor output shaft 105 may transfer torque between the AC motor 103 and other driveline components, for example a final drive 107 which may include reduction and differential gear sets and one or more axle outputs. Final drive 107 may simply include reduction gearing and a prop shaft output coupling to a differential gear set. One or more axles 109 may couple to the final drive 107 or differential gear sets if separate therefrom. Axle(s) 109 may couple to a vehicle wheel(s) for transferring tractive force between a wheel and pavement. One having ordinary skill in the art will recognize alternative arrangements for driveline components including motor-at-wheel arrangements or final drive gearsets including additional power take offs in addition to axle or prop shaft take offs. Regardless of the application arrangement, the driveline components are effective to transfer motor torque between one or more wheels and pavement.

AC motor 103 may be a polyphase AC motor such as a three phase AC motor receiving three-phase AC power over AC bus 111 which is coupled to inverter 113. Inverter 113 may include a plurality of solid-state switches such as IGBTs and power MOSFETs. The inverter 113 receives DC power over high voltage (HV) DC bus 117 from energy storage device (ESD) 115, for example at 400 volts. Controller 119 is coupled to inverter for control thereof.

Figure 2:
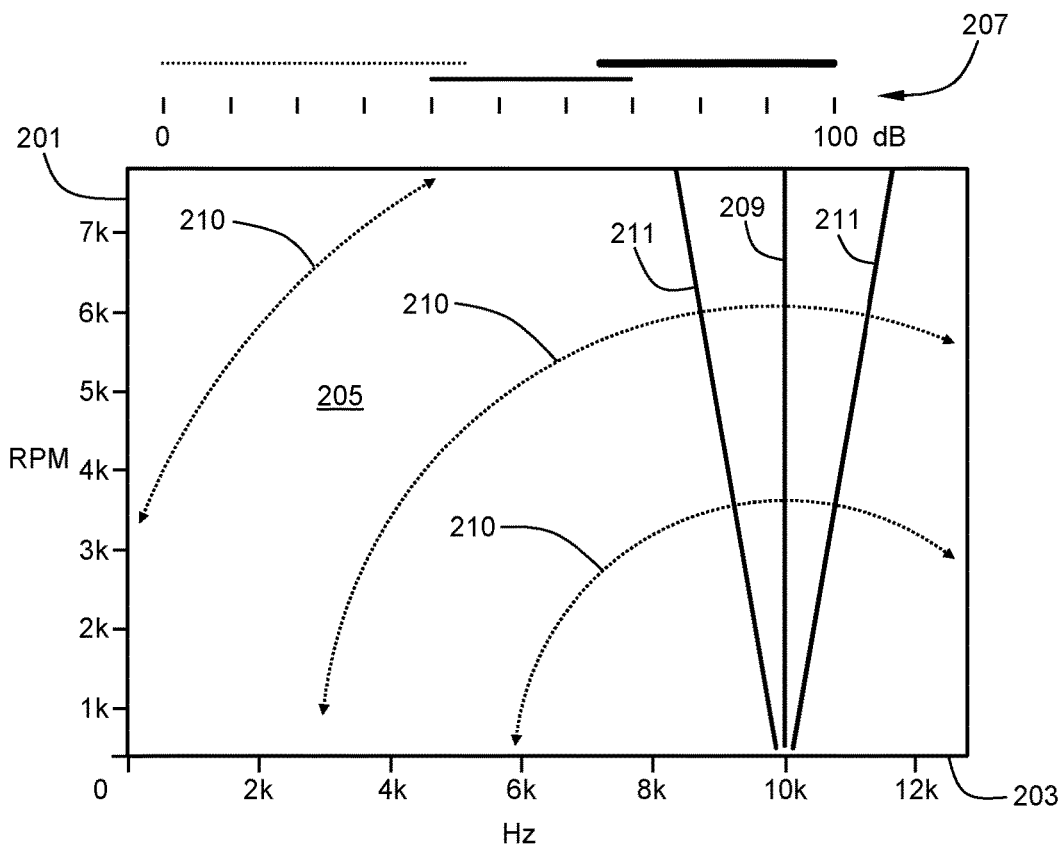
FIG. 2 illustrates a plot of electric motor speed vs. noise frequency as the inverter of the propulsion system operates at a fixed frequency, in accordance with the present disclosure.

Control of inverter 113 may include high frequency switching of solid-state switching devices. A number of design and application considerations and limitations determine inverter switching frequency. Commonly, inverter controls for AC motor applications may include fixed switching frequencies, for example switching frequencies around 10-12 kHz. Inverter switching frequency in such applications, therefore, are designed to remain static. Inverter induced noise, being predominantly influenced by the inverter 113 switching frequency, also remains substantially constant in pitch or tone even as AC motor speed varies. FIG. 2 illustrates near field noise of an exemplary embodiment of an EDU of propulsion system 101 of FIG. 1 with inverter 113 operating at a fixed frequency of 10 kHz. The vertical axis 201 represents AC motor 103 speed in revolutions per minute (RPM) and the horizontal axis 203 represents noise frequency in hertz (Hz). Sound measured in near field as the AC motor 103 is swept across operational speeds from about 0 RPM to about 8,000 RPM is represented as sound pressure level (SPL) in decibels (dB) within the sound space 205 delimited by RPM from 0 to 8,000 and noise frequency from 0 to 13 kHz. For purposes of this disclosure and as appreciated from the legend 207, the sound space 205 is roughly quantized at three SPL ranges: Low (0 to 45 dB);

Medium (40 to 70 dB) and High (65 to 100 dB). As may be appreciated, a majority of the sound space 205 is represented by Low SPL range as indicated by the curved sweeps 210. However, patterns of locally dominant SPL exist including a primary order 209 and sideband orders 211. Such patterns of locally dominant SPLs may generally be referred to herein as switching orders. The primary order 209 may be dominant with respect to absolute SPLs with the secondary, tertiary and higher orders generally having more attenuated SPLs the higher the orders go. For illustrative purposes, primary order 209 and sideband orders 211 are shown characterized by medium SPLs whose represented frequencies dominate. The remainder of the sound space 205 exhibits frequencies represented by the low SPL range. While the primary order 209 and sideband orders 211 are shown characterized by medium SPLs, it is expected that the primary order 209 will general dominate the sideband orders 211 with greater SPLs. It is thus appreciated from FIG. 2 that for a given fixed inverter frequency, the primary order 209 remains frequency invariant across all AC motor 103 speeds. Some frequency shifting may occur at sideband orders 211; however, the perceived frequency of inverter induced noise remains substantially constant in pitch or tone even as AC motor speed 103 varies due to SPL dominance of the primary order 209.

Figure 3:
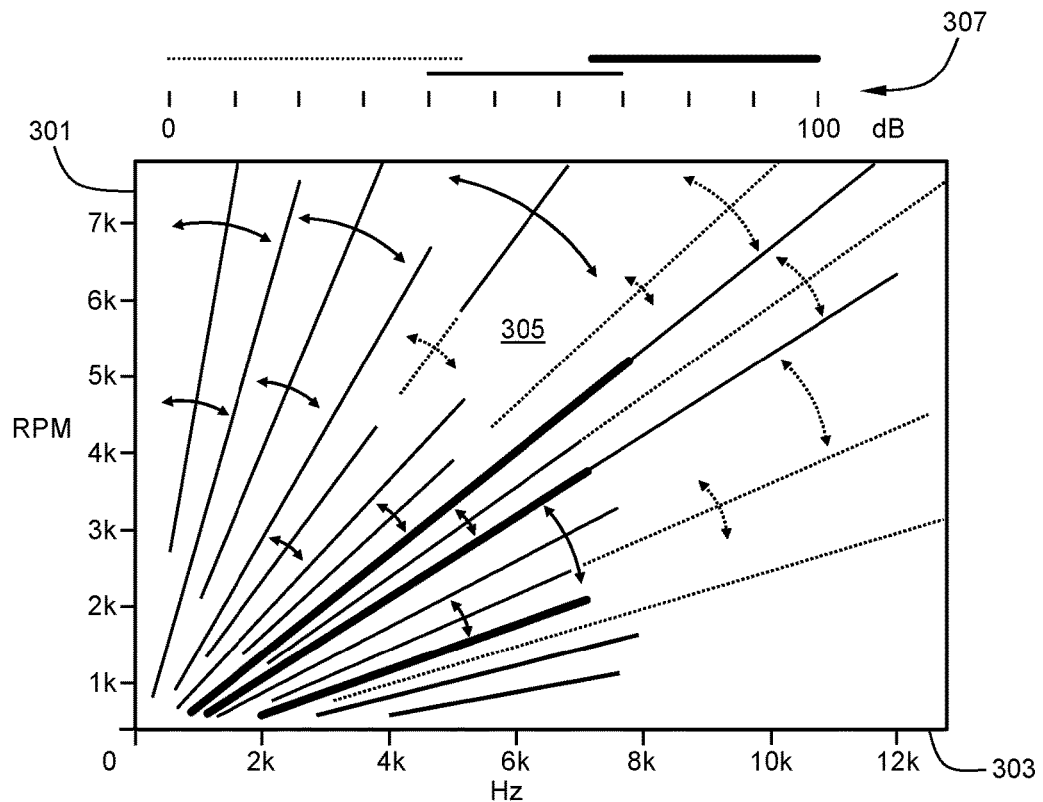
FIG. 3 illustrates a plot of electric motor speed vs. noise frequency as the inverter of the propulsion system operates at a fixed pulse ratio, in accordance with the present disclosure.
Figure 4:
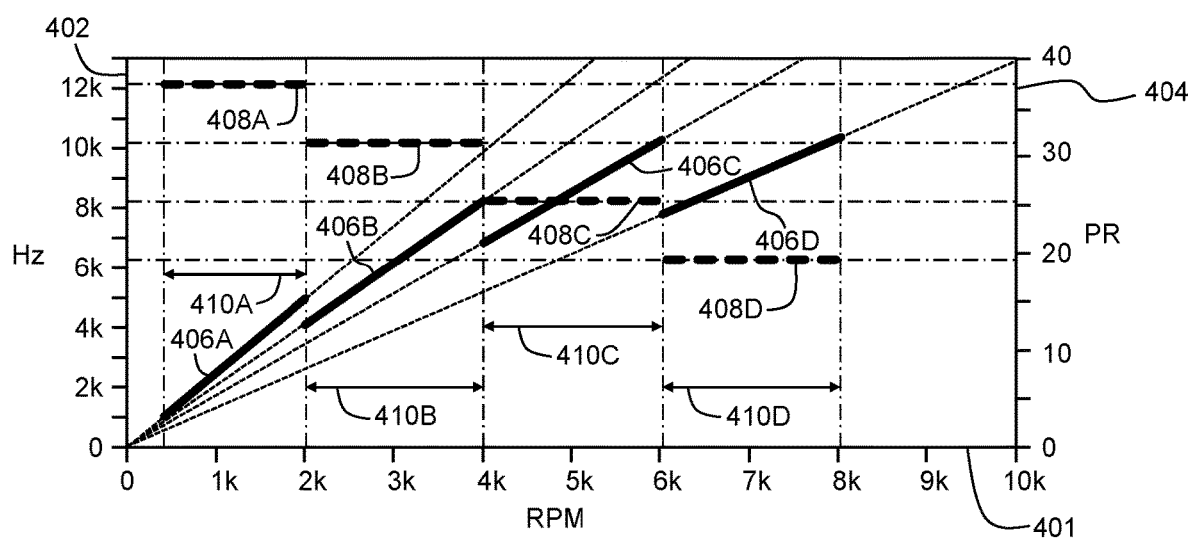
FIG. 4 illustrates a plot of inverter switching frequency vs. electric motor speed as the inverter of the propulsion system operates within discrete bands of fixed pulse ratios, in accordance with the present disclosure.

FIG. 3 illustrates near field noise of an exemplary embodiment of an EDU of propulsion system 101 of FIG. 1 with inverter 113 operating at a fixed pulse ratio (PR) over the entire AC motor 103 operating speed range from 0 RPM to 8,000 RPM. Pulse ratio (PR) as used herein and as understood by one having ordinary skill in the art is the ratio of the inverter 113 switching frequency to the fundamental electrical frequency of the AC motor 103. The fundamental electrical frequency of the AC motor 103 is proportionate to the AC motor 103 RPM and its number of poles. Thus, as AC motor 103 RPM varies, so too does the fundamental electrical frequency. Therefore, a fixed PR requires that as the AC motor 103 RPM changes, the inverter 113 switching frequency must change proportionately. FIG. 3 illustrates a sound space 305, analogous to the sound space 205 in FIG. 2, and AC motor speed axis 301 and noise frequency axis 303, analogous to axes 201 and 203, respectively, in FIG. 2. FIG. 3 also includes legend 307 with the same quantized SPL ranges set forth in FIG. 2 and discussed herein. In FIG. 3, however, the PR is controlled constant as the AC motor 103 is swept across operational speeds from about 0 RPM to about 8,000 RPM. The resultant sound measured in near field is represented as sound pressure level (SPL) in decibels (dB) within the sound space 305. Switching orders are represented by the diagonal patterns in the sound space 305 with dominant switching orders generally corresponding to the higher SPL ranges with reference to the legend 307. Dominant switching orders generally correspond to a primary order and certain lower order sidebands. Experimental results suggest that the primary and tertiary sidebands (i.e. +/−3) are generally most dominant. FIG. 4 illustrates certain exemplary linear inverter 103 switching frequency profiles 406A, 406B, 406C and 406D and respective corresponding PR profiles 408A, 408B, 408C and 408D. The left vertical axis 402 represents inverter 113 switching frequency in hertz (Hz), the right vertical axis 404 represents pulse ratio (PR) and the horizontal axis 401 represents AC motor 103 speed in revolutions per minute (RPM). In one embodiment, PR profiles may be linear profiles wherein PR values vary linearly. In one embodiment, a linear PR profile may have a fixed value. The inverter 113 switching frequency profile 406C, for example, corresponds to PR profile 408C and is the PR profile implemented in generating dominant switching orders as illustrated in the sound space 305 of FIG. 3 across substantially the entire speed spectrum of the AC motor 103. It is thus appreciated from FIG. 3 that for a given fixed value PR profile, the dominant switching orders are characterized by frequencies varying linearly with AC motor 103 RPM. Alternative PR profiles, for example 408A, 408B or 408D, similarly implemented would also yield dominant switching orders, but dominant in different regions within the sound space 305.

Figure 5:
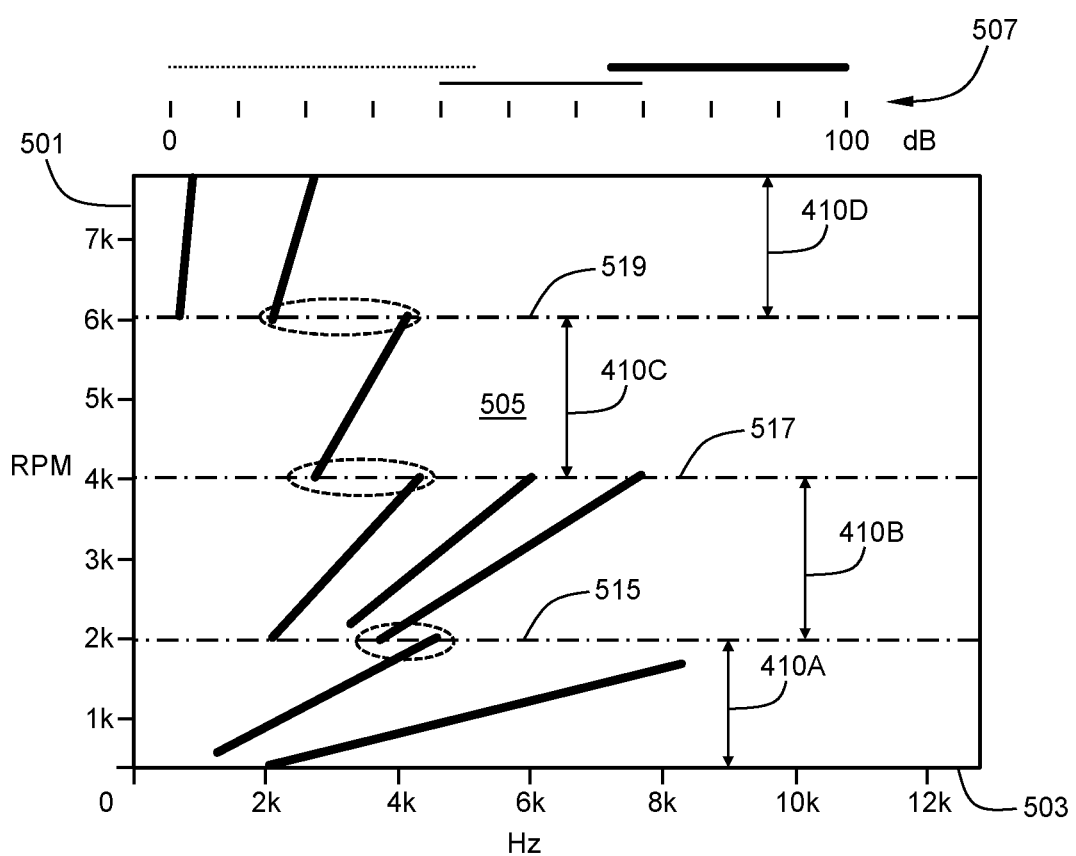
FIG. 5 illustrates a plot of electric motor speed vs. noise frequency as the inverter of the propulsion system operates at a plurality of fixed pulse ratios, in accordance with the present disclosure.

In one embodiment, AC motor 103 operational speed may be defined into substantially distinct speed regions. For example, FIG. 4 illustrates speed region 410A from about 500 RPM to about 2,000 RPM, speed region 410B from about 2,000 RPM to about 4,000 RPM, speed region 410C from about 4,000 RPM to about 6,000 RPM, and speed region 410D from about 6,000 RPM to about 8,000 RPM. Controller 119 may implement different switching frequency profiles within each of the speed regions 410A, 410B, 410C and 410D. In the present embodiment, the fixed value PR profiles 408A, 408B, 408C and 408D are chosen such that each respective fixed value PR profile varies from an adjacent fixed value PR profile by the same amount. The present exemplary fixed value PR profile values, thus, are as follows: 408A=37.5; 408B=31.5; 408C=25.5; and, 408D=19.5. In one embodiment, controller 119 may implement switching frequency profile 406A (PR profile 408A) within inverter 113 during AC motor 103 operation within speed region 410A. Similarly, controller 119 may implement profile 406B (PR profile 408B) within speed region 410B, profile 406C (PR profile 408C) within speed region 410C and profile 406D (PR profile 408D) within speed region 410D. FIG. 5 illustrates near field noise of an exemplary embodiment of an EDU of propulsion system 101 of FIG. 1 with inverter 113 operating over the entire AC motor 103 operating speed range from 0 RPM to 8,000 RPM with inverter 113 control within speed regions 410A, 410B, 410C and 410D utilizing the corresponding switching frequency profiles 406A, 406B, 406C and 406D, respectively, as described herein in connection with FIG. 4. FIG. 5 illustrates a sound space 505 analogous to the sound space 305 in FIG. 3 and AC motor speed axis 501 and noise frequency axis 503 analogous to axes 301 and 303, respectively, in FIG. 3. FIG. 5 also includes legend 507 with the same quantized SPL ranges set forth in FIG. 3 and discussed herein. In FIG. 5, as the AC motor 103 is swept across operational speeds from about 0 RPM to about 8,000 RPM, the different speed regions 410A, 410B, 410C and 410D are encountered and the corresponding switching frequency profiles 406A, 406B, 406C and 406D are implemented. The resultant sound measured in near field is represented as sound pressure level (SPL) in decibels (dB) within the sound space 505. Switching orders are represented by the diagonal patterns in the sound space 505 with dominant switching orders generally corresponding to the higher SPL ranges with reference to the legend 507. With the presently implemented switching frequency profiles 406A, 406B, 406C and 406D corresponding to respective equivalently separated, fixed value PR profiles 408A, 408B, 408C and 408D, it is appreciated that the dominant switching orders locally increase in frequency within each respective speed region, with the overall dominant switching orders decreasing in frequencies across increasing speed regions. Moreover, it is appreciated that the dominant switching orders at the transition between adjacent speed regions 410A, 410B, 410C and 410D have characteristic frequencies that vary significantly. Such transitions may be referred to as discontinuous transitions and the corresponding switching orders referred to as discontinuous adjacent switching orders. Discontinuity as used herein with respect to discontinuous transitions and discontinuous adjacent switching orders is understood to mean frequency separation of dominant orders of about 10% or greater. For example, at the speed region interface 515 between speed regions 410A, 410B, the terminal frequencies of the dominant switching orders of speed region 410A are above about 4.5 kHz whereas the initial frequencies of the dominant switching orders of speed region 410B are below about 3.5 kHz. Similarly, terminal and initial frequency pairs of respective dominant switching orders at the speed region interfaces 517 and 519 are substantially (4.25 kHz, 2.75 kHz) and (4.1 kHz, 2.1 kHz).

Figure 6:
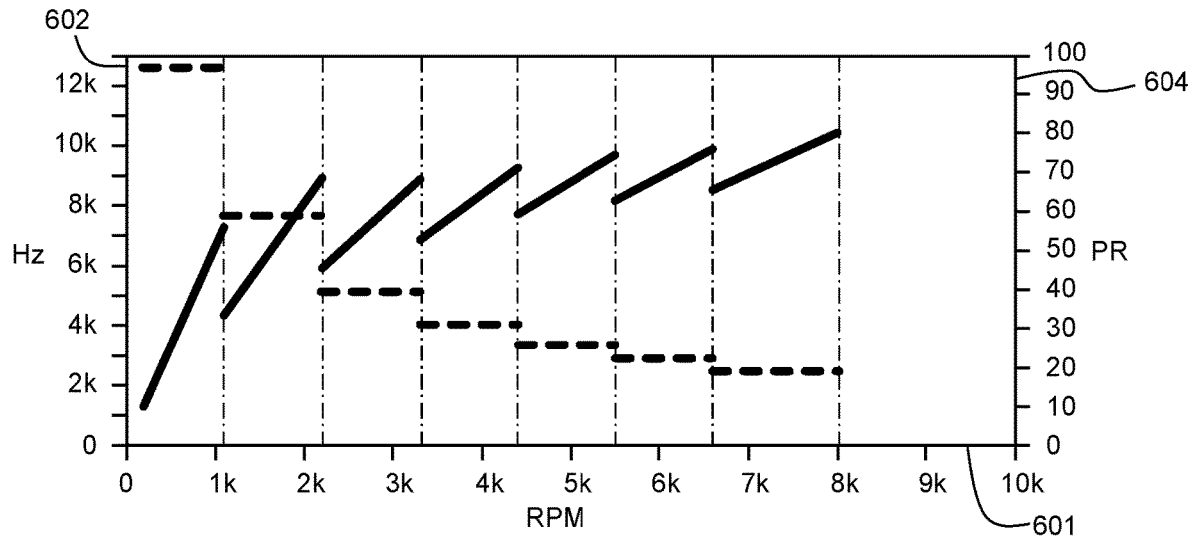
FIG. 6 illustrates a plot of noise frequency vs. electric motor speed as the inverter of the propulsion system operates at a plurality of fixed pulse ratios, in accordance with the present disclosure.
Figure 7:
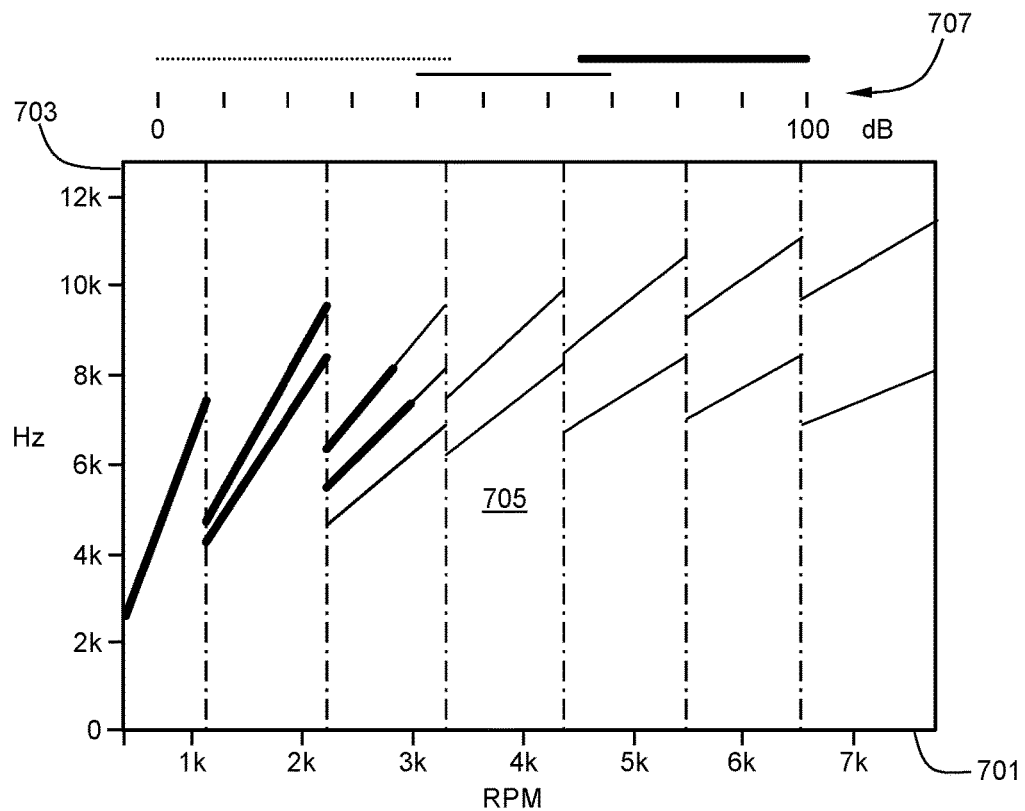
FIG. 7 illustrates a plot of inverter switching frequency vs. electric motor speed as the inverter of the propulsion system operates within discrete bands of fixed pulse ratios, in accordance with the present disclosure.

In one embodiment, controller 119 may establish a plurality of speed regions wherein the controller 119 establishes, within each speed region, a predetermined fixed value PR profile that is different from the fixed value PR profiles within each of the other speed regions. In one embodiment, the speed regions are equivalent ranges of speed but need not be. In one embodiment, the separation magnitudes between fixed value PR profiles in adjacent speed regions are equivalent. In one embodiment, at least two separation magnitudes between fixed value PR profiles in adjacent speed regions are not equivalent. In FIG. 6 the left vertical axis 602 represents inverter 113 switching frequency in hertz (Hz), the right vertical axis 604 represents pulse ratio (PR) and the horizontal axis 601 represents AC motor 103 speed in revolutions per minute (RPM). FIG. 6 illustrates a plurality of exemplary fixed value PR profiles as bold, horizontal dashed lines within a corresponding plurality of AC motor 103 speed regions illustrated between vertical dashed lines. FIG. 6 further illustrates a plurality of exemplary switching frequency profiles as bold, sloped solid lines within the corresponding plurality of AC motor 103 speed regions illustrated between the vertical dashed lines. The controller 119 may implement the switching frequency profiles within inverter 113 during AC motor 103 operation within respective speed regions as look up function in memory referenced by motor speed and PR. Alternatively, the controller 119 may implement the switching frequency profiles within inverter 113 during AC motor 103 operation within respective speed regions using linear equations. FIG. 7 illustrates near field noise of an exemplary embodiment of an EDU of propulsion system 101 of FIG. 1 with inverter 113 operating over the entire AC motor 103 operating speed range from 0 RPM to 8,000 RPM with inverter 113 control in accordance with FIG. 6 as described herein. FIG. 7 illustrates a sound space 705 analogous to the sound space 305 in FIG. 3. FIG. 7 also illustrates an AC motor speed axis 701 and noise frequency axis 703 analogous to axes 301 and 303, respectively, in FIG. 3. FIG. 7 also includes legend 707 with the same quantized SPL ranges set forth in FIG. 3 and discussed herein. In FIG. 7, as the AC motor 103 is swept across operational speeds from about 0 RPM to about 8,000 RPM, the different speed regions are encountered and the corresponding switching frequency profiles are implemented. The resultant sound measured in near field is represented as sound pressure level (SPL) in decibels (dB) within the sound space 705. Switching orders are represented by the diagonal patterns in the sound space 705 with dominant switching orders generally corresponding to the higher SPL ranges with reference to the legend 707. With the presently implemented switching frequency profiles corresponding to respective fixed value PR profiles, it is appreciated that the dominant switching orders locally increase in frequency within each respective speed region, with the overall dominant switching orders gradually trending upward in frequencies across increasing speed regions. Moreover, it is appreciated that the dominant switching orders at the transitions between adjacent speed regions (delimited by vertical broken lines) have characteristic frequencies that vary from a difference of about 2,600 Hz at the lowest RPM transition to a difference of about 1,500 Hz at the highest RPM transition. Such transitions may be referred to as discontinuous transitions and the corresponding switching orders referred to as discontinuous adjacent switching orders.

Figure 8:
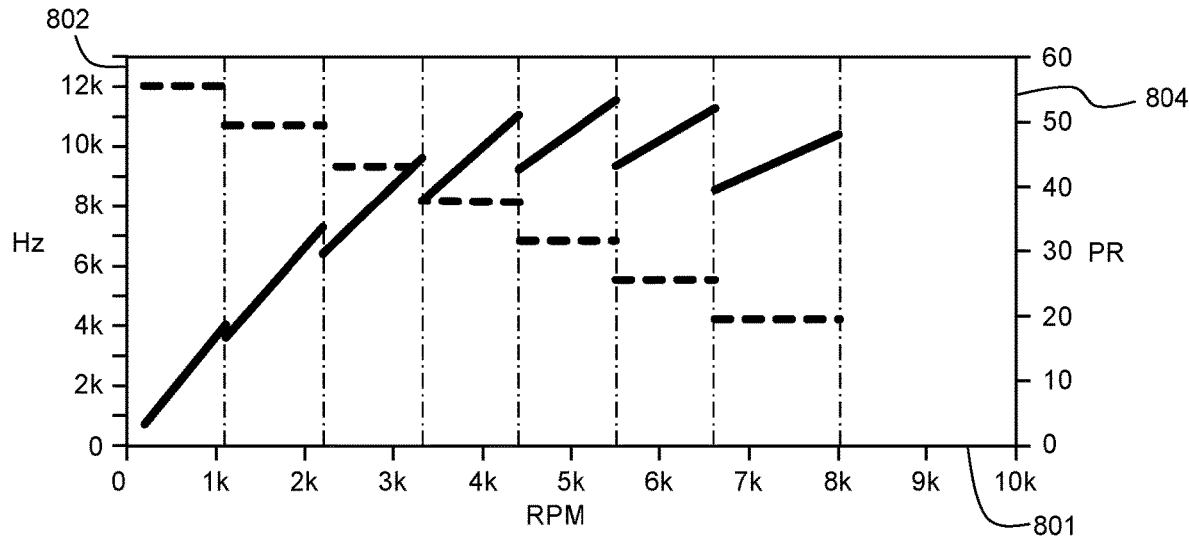
FIG. 8 illustrates a plot of noise frequency vs. electric motor speed as the inverter of the propulsion system operates at a plurality of fixed pulse ratios, in accordance with the present disclosure.
Figure 9:
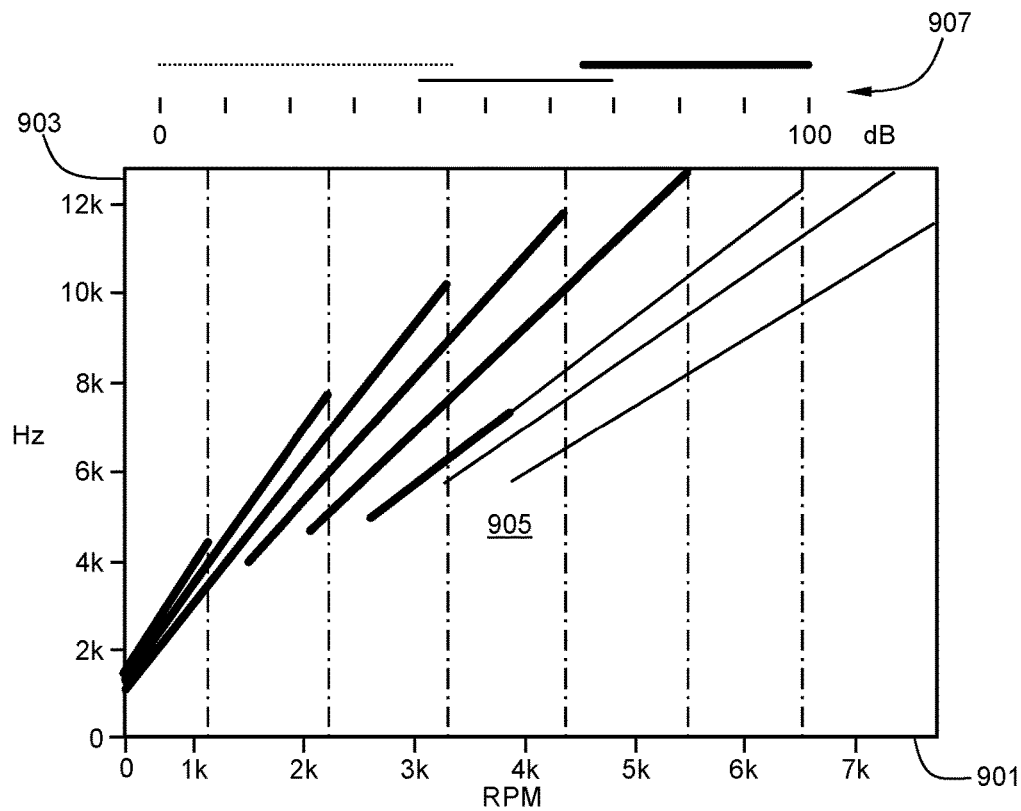
FIG. 9 illustrates a plot of inverter switching frequency vs. electric motor speed as the inverter of the propulsion system operates within discrete bands of fixed pulse ratios, in accordance with the present disclosure.

In FIG. 8 the left vertical axis 802 represents inverter 113 switching frequency in hertz (Hz), the right vertical axis 804 represents pulse ratio (PR) and the horizontal axis 801 represents AC motor 103 speed in revolutions per minute (RPM). FIG. 8 illustrates a plurality of exemplary fixed value PR profiles as bold, horizontal dashed lines within a corresponding plurality of AC motor 103 speed regions illustrated between vertical dashed lines. FIG. 8 further illustrates a plurality of exemplary switching frequency profiles as bold, sloped solid lines within the corresponding plurality of AC motor 103 speed regions illustrated between the vertical dashed lines. The controller 119 may implement the switching frequency profiles within inverter 113 during AC motor 103 operation within respective speed regions as look up function in memory referenced by motor speed and PR. Alternatively, the controller 119 may implement the switching frequency profiles within inverter 113 during AC motor 103 operation within respective speed regions using linear equations. FIG. 9 illustrates near field noise of an exemplary embodiment of an EDU of propulsion system 101 of FIG. 1 with inverter 113 operating over the entire AC motor 103 operating speed range from 0 RPM to 8,000 RPM with inverter 113 control in accordance with FIG. 8 as described herein. FIG. 9 illustrates a sound space 905 analogous to the sound spaces 305 in FIG. 3. FIG. 9 also illustrates an AC motor speed axis 901 and noise frequency axis 903 analogous to axes 301 and 303, respectively, in FIG. 3. FIG. 9 also includes legend 907 with the same quantized SPL ranges set forth in FIG. 3 and discussed herein. In FIG. 9, as the AC motor 103 is swept across operational speeds from about 0 RPM to about 8,000 RPM, the different speed regions are encountered and the corresponding switching frequency profiles are implemented. The resultant sound measured in near field is represented as sound pressure level (SPL) in decibels (dB) within the sound space 905. Switching orders are represented by the diagonal patterns in the sound space 905 with dominant switching orders generally corresponding to the higher SPL ranges with reference to the legend 907. With the presently implemented switching frequency profiles corresponding to respective fixed value PR profiles, it is appreciated that the dominant switching orders locally increase in frequency within each respective speed region, with the overall dominant switching orders moderately trending upward in frequencies across increasing speed regions. Moreover, it is appreciated that the dominant switching orders at the transitions between adjacent speed regions (delimited by vertical broken lines) have characteristic frequencies that closely match. Continuity as used herein with respect to continuous transitions and continuous adjacent switching orders is understood to mean frequency separation of dominant orders of about 5% or less. Such transitions may be referred to as continuous transitions and the corresponding switching orders referred to as continuous adjacent switching orders. It is appreciated that continuous adjacent switching orders do not require an absolute matching of orders, for example one speed region's primary order with an adjacent speed region's primary order. Rather, continuous adjacent switching orders or matching of dominant orders between adjacent regions is understood to include, for example, matching of a sideband order and a primary order, or a lower sideband order with a higher sideband order.

In another embodiment, as AC motor speed approaches zero for example, one having ordinary skill in the art recognizes practical limitations on minimum and maximum inverter switching frequencies and unavailability of control space strictly using the techniques disclosed herein. However, it is recognized for example that a frequency offset may be employed that limits the lowest inverter frequencies available for control. For example, a 2 kHz lower limit on inverter switching may be managed by holding its control constant while allowing the removal of constraints on the PR such that for a given PR and AC motor speed combination whereat when the inverter switching limit is met, further reductions in motor speed may be effected with clamped switching frequency and substantially unconstrained PR. In one embodiment, the PR or switching frequency may be controlled linearly below that motor speed. In another embodiment, lower switching frequencies may be accommodated by switching among two or more discrete switching frequency profiles as discussed herein. In another embodiment, In another embodiment, the sharp characteristic of the dominant switching orders may be softened. The dominant switching orders produced by the high frequency switching control of the inverter 113 exhibit a relatively narrow or tight bandwidth and sharp cutoff frequencies. This is perceived by a vehicle occupant as relatively sharp, tonal noise and unnatural with distinct tonality as the orders do not carry substantial harmonic content. A frequency dither of the switching frequency profile may be implemented by the controller 119. Frequency dither as the term is used herein means a randomization of the switching frequency within predetermined symmetrical band limits on switching frequency profile, for example 3% (+/−1.5%).

In another embodiment, two or more discrete switching frequency profiles or PRs may be employed in the high frequency switching control of the inverter 113. Such control may be referred to herein as multi-PR control. Multi-PR control in this regard would rapidly switch among the two or more discrete switching frequency profiles to synthesize a perceived dominant switching order that is different from those produced independently by continuous switching control of the two or more discrete switching frequency profiles. Rapid switching in this regard may mean switching among the two or more discrete switching frequency profiles rapidly enough that distinct tonal characteristics are not discernable by a vehicle occupant. This translates to switching at a frequency of at least about 10 Hz. As mentioned herein, lower switching frequency limits may be extended with this technique also. Whereas frequency dither makes use of a continuum of frequencies within a narrow band, rapid switching among two or more discrete switching frequency profiles may make use of PRs that differ by about 10% or greater and their corresponding switching frequencies.

In another embodiment, both frequency dither and multi-PR control may be employed simultaneously in the high frequency switching control of the inverter 113.

In application, the various high frequency switching controls disclosed herein may be employed through static vehicle calibrations. Alternatively, the various high frequency switching controls disclosed herein may be selectively employed in accordance with an end user's desired tonal characteristics of the vehicle. For example, one vehicle operator may prefer the audible experience of discontinuous transitions between adjacent dominant switching orders because she enjoys the repetitive frequency ramp and drop effect mimicking multi-speed ratio switching common to vehicles outfitted with multi-ratio transmissions. Other vehicle operators may prefer the smooth and continuous audible presence of the lower switching orders throughout wider RPM ranges of the AC motor 103. Personal preferences can be accommodated by way of selectivity, for example on an ad-hoc basis or in conjunction or association with operating modes such as economy or sport driving. Additionally or alternatively, the various high frequency switching controls disclosed herein may be implemented in response to throttle actuation or vehicle braking or other indication of torque requested or vehicle acceleration.

Whereas various embodiments have been disclosed setting forth control correspondence between PR and AC motor 113 RPM, one skilled in the art will recognize that such disclosure is merely by way of example and not of limitation. Known relationships between any of the various driveline component rotational speeds including wheel speed may be adequate substitutions for AC motor speed, for example. Vehicles having more than one AC motor in more complex powertrains such as vehicles having front and rear drive units may benefit from independent implementation of the high frequency switching controls disclosed herein to achieve more complex sound signatures for the vehicle.

Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements.

It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:
1. An apparatus, comprising:
an AC electric motor comprising a speed operating range and a fundamental electrical frequency;
a DC power source;
an inverter operatively coupled between the DC power source and the AC motor for converting DC power to AC power to drive the AC motor; and a processor operatively coupled to the inverter and configured to:
- parse the AC motor speed operating range into a plurality of speed regions; and
- within each speed region, operate the inverter to a respective predetermined switching frequency profile comprising linearly varying switching frequency with respect to AC motor speed effective to maintain a corresponding inverter pulse ratio to a respective constant pulse ratio of the switching frequency to the fundamental electrical frequency, wherein the respective constant pulse ratio of a corresponding speed region differs from the respective pulse ratio corresponding to an adjacent speed region.

2. The apparatus of claim 1, wherein the switching frequency profiles produce continuous switching orders in adjacent speed regions.

3. The apparatus of claim 1, wherein the switching frequency profiles produce discontinuous switching orders in adjacent speed regions.

4. The apparatus of claim 1 wherein the predetermined switching frequency profiles comprise frequency dither.

5. The apparatus of claim 1 further comprising the processor configured to operate the inverter between multiple predetermined switching frequency profiles within each speed region.

6. The apparatus of claim 5 wherein the predetermined switching frequency profiles comprise frequency dither.

7. The apparatus of claim 1 wherein the switching frequency profiles are limited to frequencies between predetermined upper and lower limits.

8. The apparatus of claim 1 further comprising the processor configured to operate the inverter at a fixed switching frequency when the AC motor speed is below a predetermined lower limit.

9. The apparatus of claim 1 further comprising the processor configured to limit operation of the inverter to switching frequencies above a predetermined lower limit.

10. A method, comprising:
- rotating a rotor of an AC motor over an operating speed range with the output from an inverter by operating the inverter at linearly varying switching frequencies that vary in proportion to rotor speed, wherein the operating speed range is parsed into a plurality of speed regions and the linearly varying switching frequencies within each operating speed region correspond to a respective constant pulse ratio of switching frequency to a fundamental electrical frequency of the AC motor, such that the respective constant pulse ratio of a corresponding operating speed region differs from the respective constant pulse ratio corresponding to an adjacent operating speed region.

11. The method of claim 10, wherein the linearly varying switching frequencies produce continuous switching orders in adjacent operating speed regions.

12. The method of claim 10, wherein the linearly varying switching frequencies produce discontinuous switching orders in adjacent operating speed regions.

13. The method of claim 10 wherein the linearly varying switching frequencies comprise frequency dither.

14. A method, comprising:
- parsing an AC motor speed operating range into a plurality of speed regions; and
- within each speed region, operating an inverter operatively coupled to the AC motor to a respective predetermined linearly varying switching frequency profile to maintain an inverter pulse ratio to a respective constant pulse ratio of the switching frequency to a fundamental electrical frequency of the AC motor, wherein the respective constant pulse ratio of a corresponding speed region differs from the respective pulse ratio corresponding to an adjacent speed region.

15. The method of claim 14, wherein the predetermined linearly varying switching frequency profiles produce continuous switching orders in adjacent speed regions.

16. The method of claim 14, wherein the predetermined linearly varying switching frequency profiles produce discontinuous switching orders in adjacent speed regions.

17. The method of claim 14 wherein the predetermined linearly varying switching frequency profiles comprise frequency dither.

\* \* \* \* \*